Oct. 23, 1951     J. D. TENCH     2,572,677
EXTRUDING NOZZLE

Filed Feb. 9, 1950     2 SHEETS—SHEET 1

INVENTOR.
JOHN D. TENCH
BY
Busser and Harding
ATTORNEYS

Oct. 23, 1951  J. D. TENCH  2,572,677
EXTRUDING NOZZLE
Filed Feb. 9, 1950  2 SHEETS—SHEET 2

INVENTOR.
JOHN D. TENCH
BY
Busser and Harding
ATTORNEYS

Patented Oct. 23, 1951

2,572,677

UNITED STATES PATENT OFFICE 2,572,677

EXTRUDING NOZZLE

John D. Tench, Prospect Park, Pa., assignor to Sun Oil Company, Philadelphia, Pa., a corporation of New Jersey Application February 9, 1950, Serial No. 143,260

8 Claims. (Cl. 18—12)

This invention relates to extrusion nozzles and more particularly to nozzles used in forming plastic material into predetermined sectional shapes where continuous thermal control is required during the extrusion step.

Briefly, a nozzle is disclosed which includes a plurality of chambers within the housing or jacket surrounding the extrusion surface or die extending the length thereof to heat preselected areas, greatly facilitating the extrusion operation. These longitudinally extending chambers adjacent to the extruding surface may be used separately or in combination with vertically divided chambers presently found in the art. By introducing variable and varied temperatures to the longitudinally extending chambers either separately or in combination, the extrusion process is controlled to produce a product which is homogeneous, of full size, and of commercial quality. It is, therefore, the object of this application to disclose a device for extruding plastic materials requiring thermal control with greater facility and a resulting uniform product.

An extrusion nozzle of the type disclosed here may be used for any kind of extruded material whether to heat or chill the mass as it moves to final form. The suggested embodiments of the device are particularly adaptable for extruding wax to form a wax slab of the dimensions required in industry. It has been discovered that wax passed through a uniformly heated nozzle or one vertically zoned by heat bands, may become deformed as it leaves the nozzle during the extrusion process. This can be controlled if different temperatures are applied on selected and predetermined areas of the die surfaces of the nozzle. If the temperatures are sufficiently variable over these shaped and critical areas, and vary from the adjoining areas, the product may be kept uniform notwithstanding variations in the material as it arrives at the extruder from the source. With this device it is possible, therefore, to readily adapt the nozzle to handle plastics generally, and to readily adjust the applied thermal controls for any change in the plastic constituents which affect the extrusion.

For a better understanding of the invention, reference is made to the figures of the accompanying drawing and the detailed description which follows.

Figures 4 to 7 inclusive, with the ends shown in sectional elevations, b, d, f and h respectively, illustrate variations of the nozzle structure.

Figure 1:
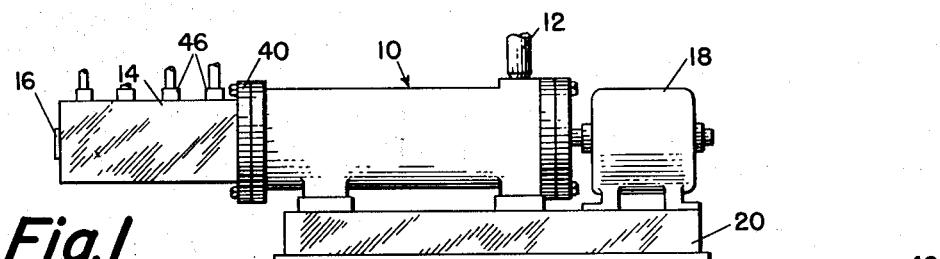
Figure 1 is an extrusion device shown diagrammatically in elevation.

One form of extruder and nozzle assembly, shown to give a complete understanding of the invention, is diagrammatically illustrated in Figure 1. The extruder selected for demonstration is of the screw feed type such as is shown in Patent No. 1,283,947 to Steinle, although any type is applicable to the present invention and is shown as numeral 10 in this figure. A source of plastic material 12 feeds the material to the device which forces it through the nozzle 14 and out through the lip 16 under the action of any suitable driving mechanism such as motor 18. A conventional base 20 mounts the elements as a complete operating device.

Figure 2:
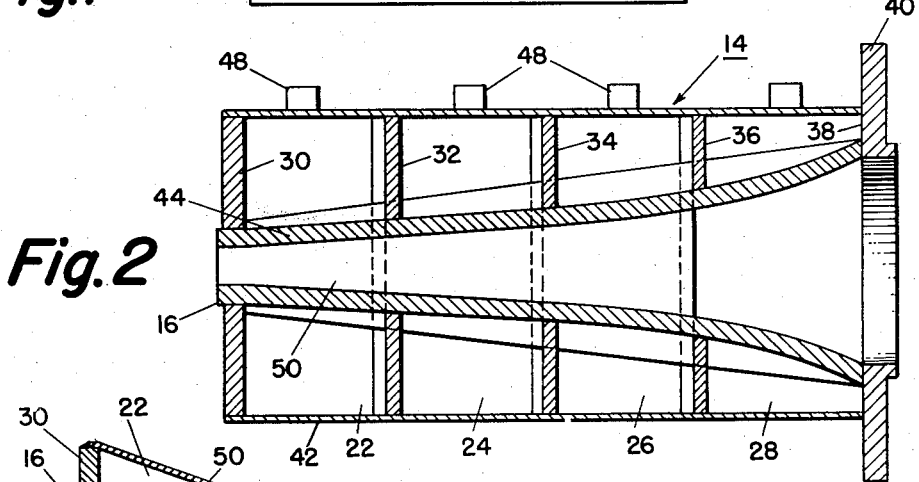
Figure 2 is an elevation in section of a nozzle along lines 2—2 of Figure 3.
Figure 3:
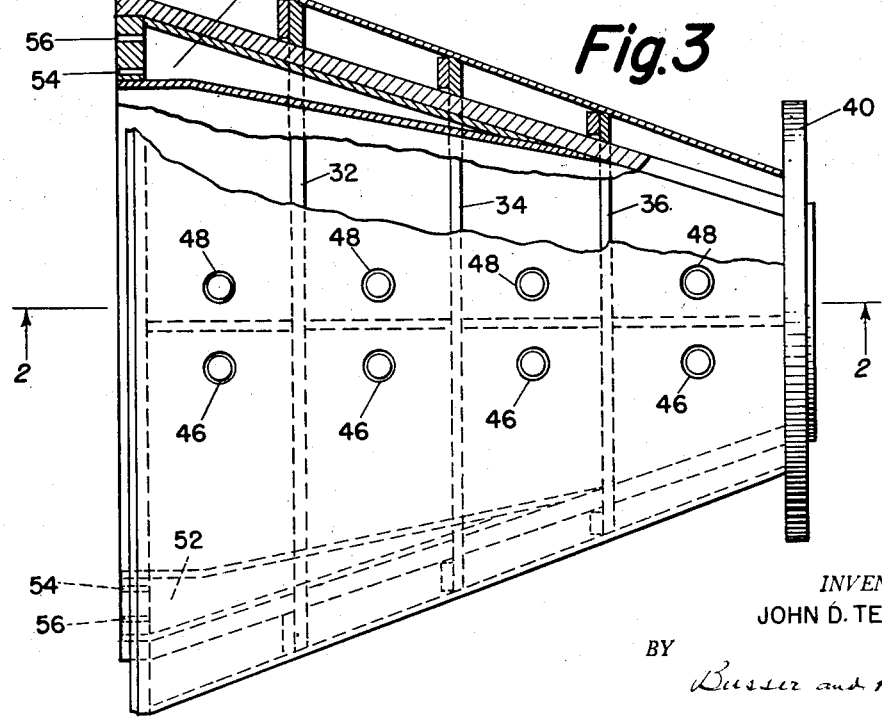
Figure 3 is a plan view, partly in section of the nozzle shown in Figure 2.
Figure 4:
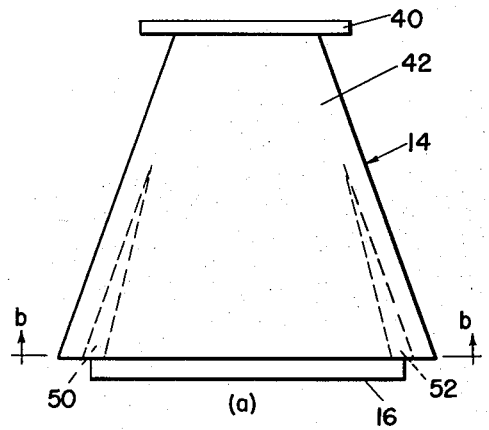

The nozzle 14, shown in detail in Figures 2 and 3, is compartmented transversely as at 22, 24, 26 and 28 by vertical partitions 30, 32, 34, 36 and 38 to give progressive thermal control from the extruder 10, to which the nozzle is coupled as by a flange 40, to the egress end or lip 16. A system of thermal control is established through the housing or jacket 42 in the several compartments and about the extruding surface or die 44 by means of fluids, controlled electrical resistance or any like heating or chilling means. In these figures a conventional liquid, capable of receiving and retaining established temperatures, is circulated by means of inlets 46 and outlets 48. This circulated liquid may be at the same temperature for all compartments, thereby insuring a sustained control throughout the nozzle and about the die, or may be graduated to facilitate the extrusion process either as a rising temperature, a lowering temperature or any alternate variation.

Under normal conditions, and for some of the plastic materials, the above described construction is sufficient for thermal control. Under conditions for which the disclosed nozzle was designed and later discussed, however, the transverse control of temperature by vertically compartmenting the jacket surrounding the die does not give the desired control. Therefore, it is necessary to include a source of thermal control separate and distinct from the jacket and in direct control of certain predetermined areas of the die surface. In the embodiment shown in Figures 2 and 3 a zone of thermal control is established along the lesser dimension of a generally rectangular cross-section of the die by inserting chambers 50 and 52 which are in prolongation of and in conformation with the die surface within the compartmented jacket already described, and extending from substantially the ingress end where the plastic material enters to the egress end or lip 16 where the extruded plastic exits from the nozzle. Separate inlets 54 and outlets 56 permit circulation of a thermal control liquid through these orifices although this may be an electrical control if added temperature is required as already noted. The longitudinal thermal control chambers 50 and 52 which control specific and predetermined zones shown here are located along a selected dimension to meet a particular problem as will be later discussed. However, similar chambers may be inserted to control any area either by elevated or reduced temperature to improve the extruded product, and may be used either in combination with or without other housing heating chambers or devices.

A series of nozzles adapted to this purpose of controlled zones or nozzle areas are developed as examples in Figures 4 to 7 inclusive accompanied by end sections lettered b to h respectively. It is not intended that these diagrammatic views be exhaustive of the many combinations of longitudinal thermal control chambers, but merely that they suggest the broad field of their application.

Figure 5:
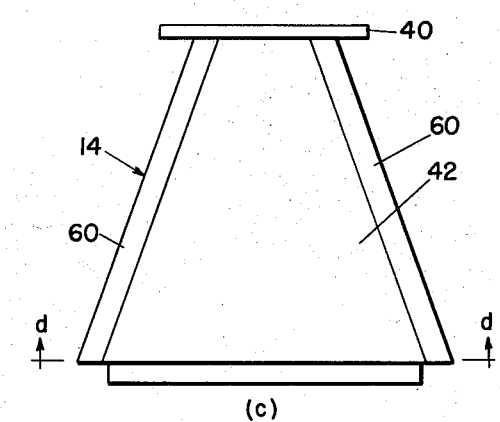
Figure 6:
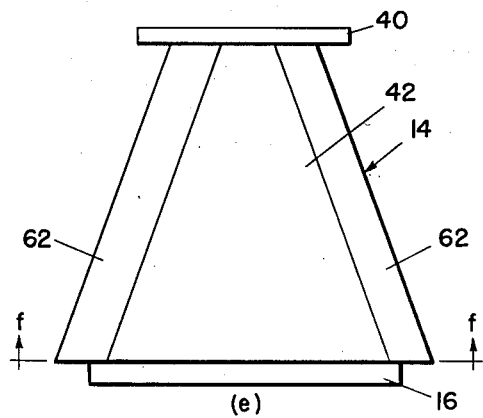
Figure 7:
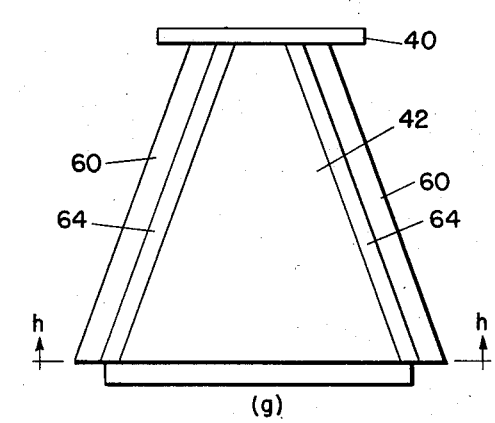

Figures 4a and b illustrate in conventional form, the nozzle already discussed at length in describing Figures 1, 2 and 3 and need not be further detailed. In these figures the numbers designating like details will be the same and follow those already used, as for example, the flange 40 is common to all the nozzles 14 and is so indicated. These views are not shown as compartmented for clarity but show the end compartment 22 in the sectional views indicating the already existing thermal control to which the longitudinally extending chambers of this invention are added. That they may be constructed either with or without the illustrated vertically divided compartments, depending upon the thermal control desired, appears to be evident. The longitudinally extending chambers with which this application is concerned may be added and conform to the die surface as previously described and shown in Figures 1, 2, 3 and 4a and b, or they may be a part of the jacket as shown in Figures 5 to 7 inclusive. The thermal control connections, either fluid or electrical, have been omitted also for clarity.

These last-mentioned figures illustrate the structure, in variations, to give the result obtained in the preferred embodiment previously disclosed. Figure 5 shows the jacket 42 with the compartmented thermal chamber 22 covering the upper and lower die surfaces of the conventional rectangularly shaped nozzle with separate longitudinally extending end chambers 60 inserted therein to thermally control the smaller dimensions at temperatures different from the other parts of the die surface. The same suggestion is indicated in Figure 6 with the difference that the longitudinally extending end chambers 62 are designed to carry the thermally controlled differential completely around the shorter dimension, thereby giving control over these edges of the plastic body as it moves through the nozzle.

In the last figure, numbers 7g and h, a modification is shown which suggests variations almost endless in number, to meet any thermal requirement in plastics extrusion. The jacket 42 has been divided by end chambers 60, similar to Figures 5c and d, and additional inserts 64 extending longitudinally of the nozzle and in contact with the die have been set in between the jacket 42 and the chambers 60. The inserted chambers 64 may be thermally controlled, either by fluid or electrically, as already discussed above for the illustrated chambers, or they may be used as separators to prevent "bleeding over" of the temperatures administered to the adjoining thermal control chambers.

Although the disclosed nozzle modifications may be used to control the shape of any extruded material and may be adapted to readily take any form of cross-section, the original development was designed to meet the requirements of wax extrusion. It was found that a nozzle thermally controlled transversely as by the compartments 22 to 28 in the jacket 42 extruded a wax slab generally poor in appearance. Most cakes had very ragged edges and some of them split down the center indicating excessive friction on the side walls or short dimension of the die. Inserted chambers 50 and 52, as shown in the preferred embodiment, Figures 1 to 4a and b inclusive, through which a liquid at higher temperatures than the jacket were circulated heated the area of the die above the temperature of the other surfaces and corrected this defect.

It is not possible, however, to merely set the temperatures of the thermal control for the various compartments and chambers. From time to time, depending upon initial temperatures of the wax feed in our example, the composition of the wax, rates of flow, and general natural conditions of the atmosphere and the extruding equipment, require changes in the relative temperatures of the chambers and compartments to be made. A comparison between runs of typical paraffin wax and typical microcrystalline wax having different melting points shows that a difference in jacket temperatures of 10 to 20 degrees required a 30 degree change in the inserted chambers. Under these conditions, the desired result was obtained by thermal control on the shorter dimensioned sides of the die 44. It will be evident that flexibility of operation is obtained, possible of change at any time during the operation, that cannot be secured in known nozzles.

To those versed in the art, the present disclosure will suggest modifications to extruding nozzles to meet any condition, any material of the type extruded and any shape of cross-section. It is the intention of the invention to indicate that longitudinally extending thermal control chambers may be adapted to any nozzle of any shape to either increase or decrease the temperature of selected areas of the die to thereby obtain a finished product with the greatest facility.

I claim:

1. An extruding nozzle adapted to form moldable materials during the passage therethrough comprising a die; a housing enclosing said die; a plurality of independently controlled temperature zones extending longitudinally of and in temperature exchange contact with selected areas of said die, to vary the temperatures of said areas during the extrusion operation.

2. An extruding nozzle adapted to form moldable materials during the passage therethrough comprising a die; a housing enclosing said die; a plurality of horizontally extending chambers within said housing extending from the egress end of said nozzle substantially to the ingress end thereof in temperature exchange relation with said die; means to supply fluids of predetermined temperatures selectively to said chambers as required in the extruding operation.

3. An extruding nozzle adapted to form moldable materials during the passage therethrough comprising a die; a jacket enclosing said die; partitions between the jacket and said die forming a plurality of longitudinally extending chambers therein adjacent said die; means to supply temperature control medium at varying degrees of temperature; conduits connecting said means to said chambers whereby the temperatures of selected areas of the die surface extending from the material ingress end to the egress of the nozzle may be controlled and varied.

4. An extruding nozzle adapted to form moldable materials into desired sections during passage therethrough comprising a die; a jacket enclosing said die; means for circulating a temperature control medium through said jacket to maintain the die at a generally uniform temperature; chambers within said die formed to continue the extruding surface and extending substantially the length thereof; and means for circulating temperature control mediums of selected temperatures through said chambers whereby the temperatures of areas of the die surface may be varied from the temperature of the jacket medium.

5. An extruding nozzle adapted to form moldable materials into desired sections during passage therethrough comprising an extruding die of a rectangular cross-section at the point of egress, a jacket enclosing said die, means for circulating a temperature control medium through said jacket to maintain said die at a generally uniform temperature, a chamber on each side and within said die conforming to the short dimensions of the rectangular opening and extending within said die as a molding surface from the point of egress substantially to the ingress end thereof, and a second means to circulate a temperature control medium of a temperature different from that of the jacket, through said chambers.

6. An extruding nozzle adapted to form moldable materials during the passage therethrough comprising a die having an extruding surface terminating in a substantially rectangular section; a housing enclosing said die; a pair of vertical heating chambers within said housing, extending the length thereof in heat exchange relation with the sides of the die extruding surface; and a pair of horizontal heating chambers within said housing, between said vertical chambers, and in heat exchange relation with the top and bottom of the die extruding surface; means for circulating thermal control mediums of predetermined temperatures through said chambers whereby temperatures of predetermined areas of the inner extruding surface may be varied and controlled.

7. An extruding nozzle adapted to form moldable materials during the passage therethrough comprising a die having an inner extruding surface extending therethrough; a transversely compartmented jacket enclosing said surface; means for circulating thermal control mediums through the compartments of said jacket to control the temperatures of transverse areas of said extruding surface; longitudinal chambers adjacent the die extruding surface extending substantially the length and positioned over predetermined areas thereof; and means for circulating thermal control mediums of selected temperatures through said chambers.

8. In an extruding nozzle including a die, a jacket enclosing said die, a plurality of transverse chambers in said jacket, and thermal circulating means connected to the chambers, the improvement comprising a plurality of longitudinally extending chambers adjacent the die extruding surface positioned to thermally control predetermined areas thereof, and means for circulating thermal control mediums of selected temperatures through said longitudinally extending chambers.

JOHN D. TENCH.

REFERENCES CITED

The following references are of record in the file of this patent:

UNITED STATES PATENTS

| Number | Name | Date |
|---|---|---|
| 2,245,640 | Beattie | June 17, 1941 |
| 2,367,451 | West | Jan. 16, 1945 |